United States Patent
Yang et al.

(10) Patent No.: US 10,757,727 B2
(45) Date of Patent: *Aug. 25, 2020

(54) SIGNAL PROCESSING METHOD FOR LOW-COST DEVICE, AND APPARATUS FOR SAME

(71) Applicant: LG ELECTRONICS INC., Seoul (KR)

(72) Inventors: Suckchel Yang, Seoul (KR); Joonkui Ahn, Seoul (KR); Hyangsun You, Seoul (KR); Yunjung Yi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/027,936

(22) Filed: Jul. 5, 2018

(65) Prior Publication Data

US 2018/0317253 A1 Nov. 1, 2018

Related U.S. Application Data

(63) Continuation of application No. 15/309,090, filed as application No. PCT/KR2015/004539 on May 7, 2015, now Pat. No. 10,028,300.

(Continued)

(51) Int. Cl.
*H04W 72/12* (2009.01)
*H04W 74/08* (2009.01)
*H04W 72/04* (2009.01)

(52) U.S. Cl.
CPC ..... *H04W 72/1289* (2013.01); *H04W 72/042* (2013.01); *H04W 74/0833* (2013.01); *H04W 72/1273* (2013.01)

(58) Field of Classification Search
CPC ........ H04W 72/1289; H04W 72/1273; H04W 72/042; H04W 74/0833
See application file for complete search history.

(56) References Cited

U.S. PATENT DOCUMENTS 7,466,985 B1 * 12/2008 Handforth ............. H04W 72/08 455/454
7,519,065 B2 * 4/2009 Angle ................... H04L 12/1881 370/395.4

(Continued)

OTHER PUBLICATIONS

Intel Corporation, "Details on PDSCH scheduling for low cost MTC UE," 3GPP TSG-RAN WG1 #76bis, R1-141147, Shenzhen, China, Mar. 31-Apr. 4, 2014, pp. 1/8-8/8.

(Continued)

*Primary Examiner* — Rasheed Gidado
(74) *Attorney, Agent, or Firm* — Birch, Stewart, Kolasch & Birch, LLP

(57) ABSTRACT

A method of receiving a downlink signal by a user equipment in a wireless communication system is discussed. The method includes receiving a plurality of scheduling information, each scheduling information being associated with a respective data in a same time unit, and receiving at least one of a plurality of the respective data based on whether sizes of the first and second data are under a processing capability of the user equipment, wherein the processing capability of the user equipment includes two maximum data sizes, and a first maximum data size T1 is smaller than a second maximum data size T2.

16 Claims, 6 Drawing Sheets

Related U.S. Application Data

(60) Provisional application No. 62/002,191, filed on May 23, 2014, provisional application No. 61/990,664, filed on May 8, 2014.

(56) References Cited

U.S. PATENT DOCUMENTS

| | | | | |
|---|---|---|---|---|
| 8,369,280 B2* | 2/2013 | Dinan | ............... | H04L 1/00 370/330 |
| 8,891,517 B2* | 11/2014 | Marshall | ............... | H04L 49/254 370/388 |
| 9,455,809 B2* | 9/2016 | Kim | ............... | H04L 5/001 |
| 9,516,653 B2* | 12/2016 | Yang | ............... | H04W 72/042 |
| 9,750,004 B2* | 8/2017 | Xue | ............... | H04W 72/1226 |
| 9,985,915 B2* | 5/2018 | Skog | ............... | H04L 67/06 |
| 2004/0083291 A1* | 4/2004 | Pessi | ............... | H04L 65/605 709/227 |
| 2006/0239195 A1* | 10/2006 | Camins | ............... | H04L 12/1863 370/235 |
| 2012/0082125 A1* | 4/2012 | Huang | ............... | H04L 5/0007 370/329 |
| 2013/0083753 A1 | 4/2013 | Lee et al. | | |
| 2013/0294379 A1* | 11/2013 | Guo | ............... | H04W 80/02 370/329 |

OTHER PUBLICATIONS

NEC, "PDSCH scheduling options for low cost MTC UEs not in enhanced coverage mode," 3GPP TSG RAN WG1 Meeting #76bis, R1-141201, Shenzhen, China, Mar. 31-Apr. 4, 2014, pp. 1-3.

NSN et al., "PDSCH Scheduling for Low Cost MTC UE," 3GPP TSG-RAN WG1 Meeting #76bis, R1-141525, Shenzhen, China, Mar. 31-Apr. 4, 2014, 4 pages.

ZTE Corporation, "Analysis on Low Cost MTC UEs," 3GPP TSG RAN WG1 Meeting #76bis, R1-141411, Shenzhen, China, Mar. 31-Apr. 4, 2014, pp. 1-3.

* cited by examiner

SIGNAL PROCESSING METHOD FOR LOW-COST DEVICE, AND APPARATUS FOR SAME

CROSS-REFERENCE TO RELATED APPLICATIONS

This Application is a Continuation of co-pending U.S. patent application Ser. No. 15/309,090 filed on Nov. 4, 2016, which is the National Phase of PCT International Application No. PCT/KR2015/004539 filed on May 7, 2015, which claims the priority benefit under 35 U.S.C. § 119(e) to U.S. Provisional Application Nos. 62/002,191 filed on May 23, 2014 and 61/990,664 filed on May 8, 2014, all of which are hereby expressly incorporated by reference into the present application.

BACKGROUND OF THE INVENTION

Field of the Invention

The present invention relates to a method of receiving/processing a signal in a wireless communication system and apparatus for the same. More particularly, the present invention relates to a method of receiving/processing a signal for a low-price user equipment and apparatus for the same.

Discussion of the Related Art

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi Carrier Frequency Division Multiple Access (MC-FDMA) system. In a wireless communication system, a User Equipment (UE) may receive information from a Base Station (BS) on a Downlink (DL) and transmit information to the BS on an Uplink (UL). The UE transmits or receives data and various types of control information. Various physical channels exist according to the types and usages of information that the UE transmits or receives.

SUMMARY OF THE INVENTION

The technical task of the present invention is to provide an efficient method of receiving/processing a signal in a wireless communication system and apparatus for the same. Particularly, the technical task of the present invention is to provide a method of receiving/processing a signal for a low-price user equipment and apparatus for the same.

The technical problems solved by the present invention are not limited to the above technical problems and those skilled in the art may understand other technical problems from the following description.

In one technical aspect of the present invention, provided herein is a method of receiving a downlink signal by a user equipment in a wireless communication system, including receiving a first PDCCH (Physical Downlink Control Channel) including a scheduling information on a first common data in a subframe, receiving a second PDCCH including a scheduling information on a second common data in the subframe and controlling a process for receiving a downlink data in the subframe based on TB (Transport Block) size Ta of the first common data and TB size Tb of the second common data, wherein if $T1<Ta\leq T2$ and $T1<Tb\leq T2$, a received signal processing is performed on the first common data or the second common data, wherein if $Ta\leq T1$ and $T1<Tb\leq T2$ or $T1<Ta\leq T2$ and $Tb\leq T1$, the received signal processing is performed on both the first common data and the second common data, wherein the T1 indicates a maximum TB size in case of receiving a unicast data solely, and wherein the T2 indicates a maximum TB size in case of receiving a common data solely.

In another technical aspect of the present invention, provided herein a user equipment used for a wireless communication system, including an RF (Radio Frequency) unit and a processor, wherein the processor is configured to receive a first PDCCH (Physical Downlink Control Channel) including a scheduling information on a first common data in a subframe, receive a second PDCCH including a scheduling information on a second common data in the subframe and control a process for receiving a downlink data in the subframe based on TB (Transport Block) size Ta of the first common data and TB size Tb of the second common data, wherein if $T1<Ta\leq T2$ and $T1<Tb\leq T2$, a received signal processing is performed on the first common data or the second common data, wherein if $Ta\leq T1$ and $T1<Tb\leq T2$ or $T1<Ta\leq T2$ and $Tb\leq T1$, the received signal processing is performed on both the first common data and the second common data, wherein the T1 indicates a maximum TB size in case of receiving a unicast data solely and wherein the T2 indicates a maximum TB size in case of receiving a common data solely.

The first common data may include an SIB (System Information Block) and the second common data may include an RAR (Random Access Response).

If $T1<Ta\leq T2$ and $T1<Tb\leq T2$, the received signal processing may be performed on only the SIB among the SIB and the RAR.

If $T1<Ta\leq T2$ and $T1<Tb\leq T2$, the received signal processing may be performed on only the RAR among the SIB and the RAR.

If $T1<Ta\leq T2$ and $T1<Tb\leq T2$ and if the RAR is transmitted as a part of a contention-based RACH (Random Access Channel), the received signal processing may be performed on only the SIB among the SIB and the RAR.

If $T1<Ta\leq T2$ and $T1<Tb\leq T2$ and if the RAR is transmitted as a part of a non-contention-based RACH process, the received signal processing may be performed on only the RAR among the SIB and the RAR.

According to embodiments of the present invention, a signal can be efficiently received/processed in a wireless communication system. Particularly, a signal can be efficiently received/processed in a low-price user equipment.

Effects obtainable from the present invention are non-limited by the above mentioned effect. And, other unmentioned effects can be clearly understood from the following description by those having ordinary skill in the technical field to which the present invention pertains.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE EMBODIMENTS

The configuration, operation, and other features of the present invention will readily be understood with embodiments of the present invention described with reference to the attached drawings. Embodiments of the present invention may be used for various radio access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), Multi-Carrier Frequency Division Multiple Access (MC-FDMA), etc. CDMA may be implemented as a radio technology such as Universal Terrestrial Radio Access (UTRA) or CDMA2000. TDMA may be implemented as a radio technology such as Global System for Mobile communications/General packet Radio Service/Enhanced Data Rates for GSM Evolution (GSM/GPRS/EDGE). OFDMA may be implemented as a radio technology such as Institute of Electrical and Electronic Engineers (IEEE) 802.11 (Wi-Fi), IEEE 802.16 (WiMAX), IEEE 802.20, Evolved UTRA (E-UTRA), etc. UTRA is a part of Universal Mobile Telecommunications System (UMTS). 3rd Generation Partnership Project Long Term Evolution (3GPP LTE) is a part of Evolved UMTS (E-UMTS) using E-UTRA, and LTE-Advanced (LTE-A) is an evolution of 3GPP LTE.

While the embodiments of the present invention will be described below mainly in the context of a 3GPP system, this is purely exemplary and thus should not be construed as limiting the present invention.

While the present invention is described in the context of an LTE-A system, the proposed concept or methods of the present invention and embodiments of the proposed concept or methods are applicable to other multi-carrier systems (e.g., an IEEE 802.16m system) without restriction.

Figure 1:
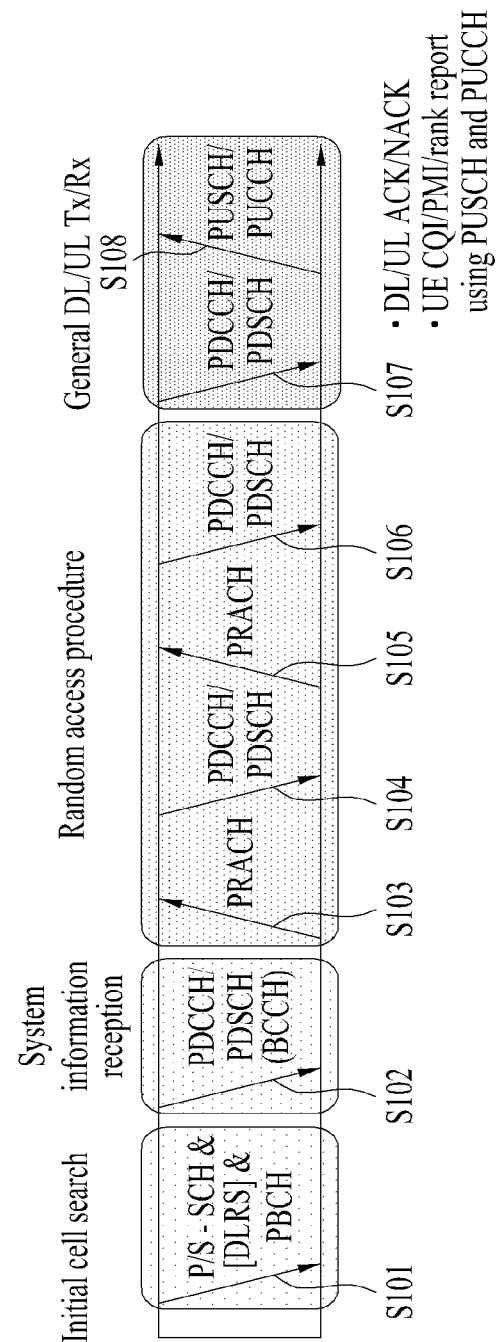
FIG. 1 illustrates physical channels and a general signal transmission method using the physical channels in a Long Term Evolution(-Advanced) (LTE-(A)) system.

FIG. 1 illustrates physical channels and a general method for transmitting signals on the physical channels in an LTE(-A) system.

Referring to FIG. 1, when a User Equipment (UE) is powered on or enters a new cell, the UE performs initial cell search in step S101. The initial cell search involves acquisition of synchronization to an evolved Node B (eNB). Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information (i.e., a Master Information Block (MIB)) broadcast in the cell by receiving a Physical Broadcast Channel (PBCH) from the eNB. During the initial cell search, the UE may monitor a Downlink (DL) channel state by receiving a DownLink Reference Signal (DL RS).

After the initial cell search, the UE acquires detailed system information (i.e. a System Information Block (SIB)) by receiving a Physical Downlink Control Channel (PDCCH) and receiving a Physical Downlink Shared Channel (PDSCH) based on information included in the PDCCH in step S102.

Then, the UE may perform a random access procedure with the eNB to complete the connection to the eNB in step S103 to S106. In the random access procedure, the UE may transmit a preamble on a Physical Random Access Channel (PRACH) (S103) and may receive a response message to the preamble on a PDCCH and a PDSCH associated with the PDCCH (S104). In the case of contention-based random access, the UE additionally performs a contention resolution procedure including transmission of a Physical Uplink Shared Channel (PUSCH) (S105) and reception of a PDCCH and its associated PDSCH (S106).

After the above procedure, the UE may receive a PDCCH/PDSCH (S107) and transmit a PUSCH/PUCCH (S108) in a general UL/DL signal transmission procedure.

Figure 2:
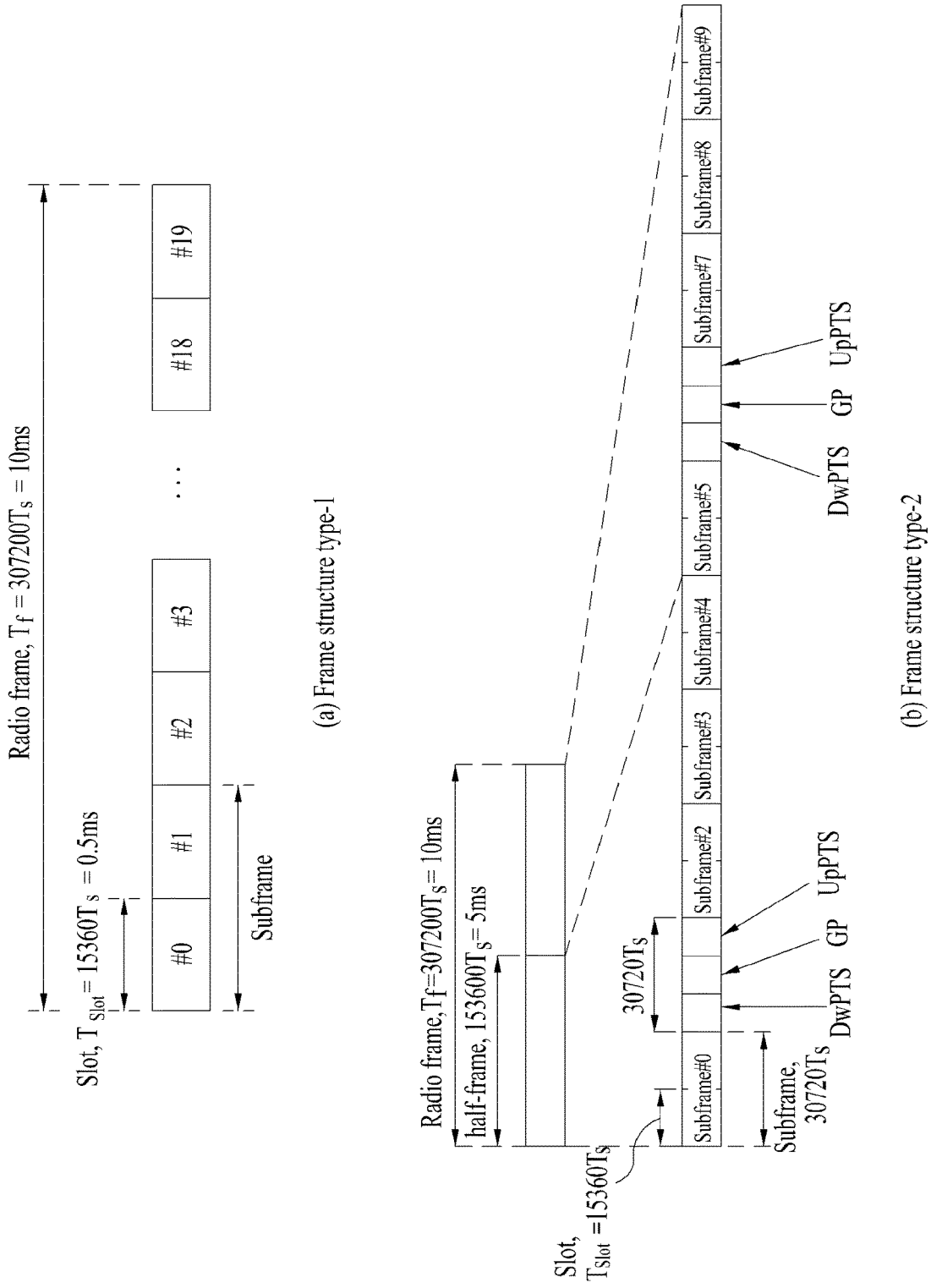
FIG. 2 illustrates a radio frame structure in the LTE(-A) system.

FIG. 2 illustrates a radio frame structure in the LTE(-A) system. The 3GPP LTE standards support a type 1 radio frame structure applicable to Frequency Division Duplex (FDD) and a type 2 radio frame structure applicable to Time Division Duplex (TDD).

FIG. 2(a) is a diagram illustrating the structure of the type 1 radio frame. An FDD radio frame includes only DL subframes or only UL subframes. The radio frame includes 10 subframes, each subframe including two slots in the time domain. One subframe may be 1 ms long and one slot may be 0.5 ms long. One slot includes a plurality of (DL) OFDM symbols or a plurality of (UL) SC-FDMA symbols in the time domain. Unless mentioned otherwise, an OFDM symbol or an SC-FDMA symbol may be simply referred to as a symbol (sym), herein.

FIG. 2(b) illustrates the structure of the type 2 radio frame. A TDD radio frame includes two half frames, each half frame including four (five) general subframes and one (zero) special subframe. The general subframes are used for UL or DL according to a UL-DL configuration and the special subframe includes a Downlink Pilot Time Slot (DwPTS), a Guard Period (GP), and an Uplink Pilot Time Slot (UpPTS). In the special subframe, DwPTS is used for initial cell search, synchronization, or channel estimation at a UE. UpPTS is used for an eNB to perform channel estimation and acquire UL synchronization with a UE. The GP is used to cancel UL interference between a UL and a DL, caused by the multi-path delay of a DL signal. A subframe includes two slots.

Table 1 lists exemplary subframe configurations for a radio frame according to UL-DL configurations.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D represents a DL subframe, U represents a UL subframe, and S represents a special subframe.

Figure 3:
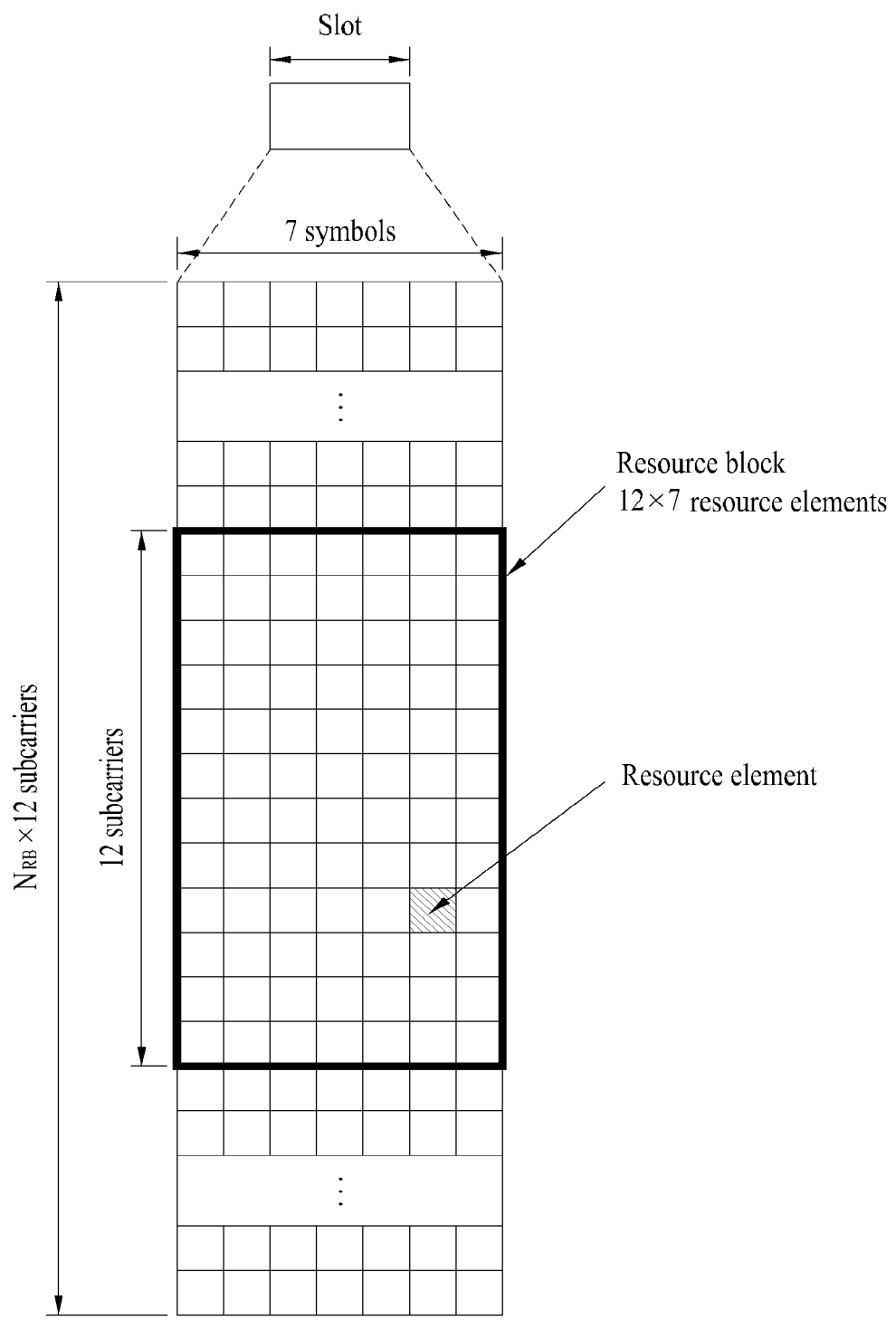
FIG. 3 illustrates a resource grid of a slot.

FIG. 3 illustrates a resource grid for the duration of one slot. A slot includes a plurality of symbols (e.g., OFDM symbols or SC-FDMA symbols), for example, 6 or 7 symbols in the time domain by a plurality of Resource Blocks (RBs) in the frequency domain. Each RB includes 12 subcarriers. Each element of a resource grid is called a Resource Element (RE). The RE is a minimum resource unit for signal transmission and one modulation symbol is mapped to an RE.

Figure 4:
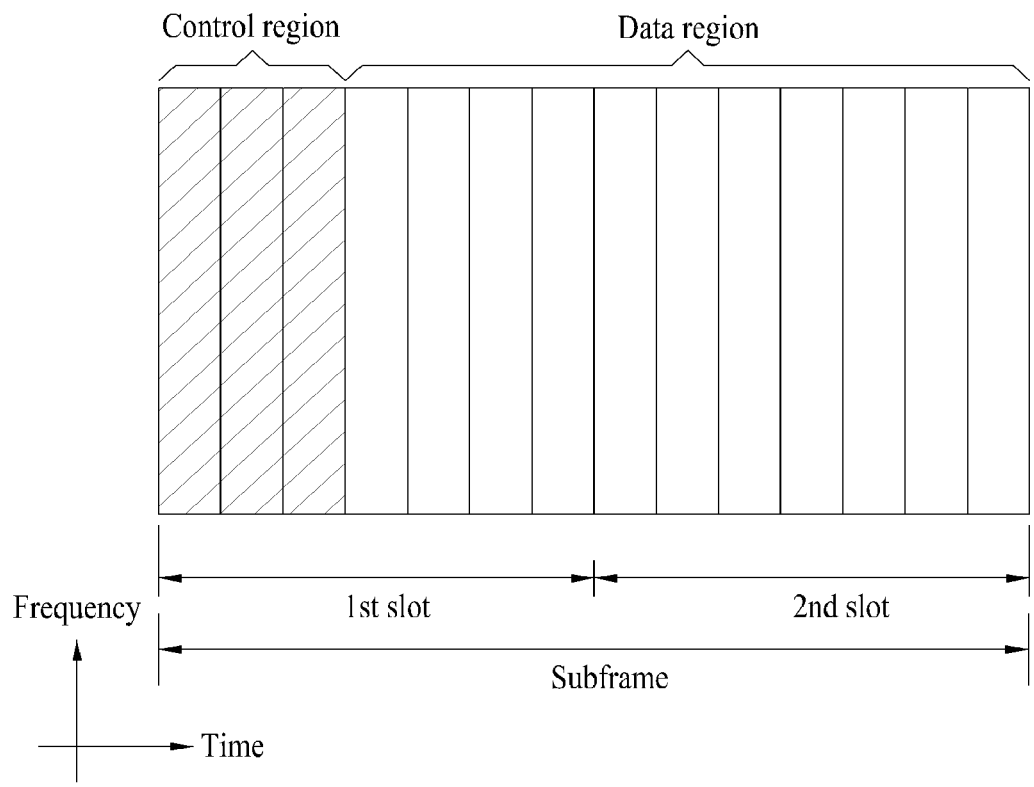
FIG. 4 illustrates an exemplary Downlink (DL) SubFrame (SF) structure.

FIG. 4 illustrates a structure of a DL subframe. Up to 3 (or 4) OFDM symbols at the start of the first slot of a DL subframe are used as a control region to which a control channel is allocated and the remaining OFDM symbols of the DL subframe are used as a data region to which a shared channel (e.g., a PDSCH) is allocated. DL control channels include a Physical Control Format Indicator Channel (PCFICH), a PDCCH, a Physical Hybrid automatic repeat request (ARQ) Indicator Channel (PHICH), etc.

The PCFICH is located in the first OFDM symbol of a subframe, carrying information about the number of OFDM symbols used for transmission of control channels in the subframe. The PHICH occupies 4 RE Groups (REGs) distributed equally in the control region based on a cell Identifier (ID). The PCFICH indicates a value ranging 1 to 3 (or 2 to 4) and is modulated in Quadrature Phase Shift Keying (QPSK). The PHICH delivers an HARQ ACKnowledgment/Negative ACKnowledgment (ACK/NACK) signal as a response to a UL transmission. The PHICH is allocated to the remaining REGs of one or more OFDM symbols corresponding to a PHICH duration, except for REGs carrying Cell-specific Reference Signals (CRSs) and the PCFICH (the first OFDM symbol). The PHICH is allocated to 3 REGs distributed as much as possible in the frequency domain.

The PDCCH delivers information about resource allocation and a transport format for a Downlink Shared Channel (DL-SCH), information about resource allocation and a transport format for an Uplink Shared Channel (UL-SCH), paging information of a Paging Channel (PCH), system information on the DL-SCH, information about resource allocation for a higher-layer control message such as a random access response transmitted on the PDSCH, a set of transmission power control commands for individual UEs of a UE group, a Transmit Power Control (TPC) command, Voice Over Internet Protocol (VoIP) activation indication information, etc. A plurality of PDCCHs may be transmitted in the control region. A UE may monitor a plurality of PDCCHs. A PDCCH is transmitted in an aggregate of one or more consecutive Control Channel Elements (CCEs). A CCE is a logical allocation unit used to provide a PDCCH at a coding rate based on the state of a radio channel. A CCE includes a plurality of REGs. The format of a PDCCH and the number of available bits for the PDCCH are determined according to the number of CCEs.

[Table 2] lists the number of CCEs, the number of REGs, and the number of PDCCH bits for each PDCCH format.

TABLE 2

| PDCCH format | Number of CCEs (n) | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

The CCEs may be numbered consecutively and a PDCCH having a format with n CCEs may start only at a CCE with an index being a multiple of n. The number of CCEs used for transmission of a specific PDCCH is determined according to a channel condition by an eNB. For example, if the PDCCH is for a UE having a good DL channel (e.g., a UE near to the eNB), one CCE may be sufficient for the PDCCH. On the other hand, if the PDCCH is for a UE having a poor channel (e.g., a UE near to a cell edge), 8 CCEs may be used for the PDCCH in order to achieve sufficient robustness. In addition, the power level of the PDCCH may be controlled according to the channel condition.

Control information transmitted on a PDCCH is called Downlink Control Information (DCI). Various DCI formats are defined according to the usages of the DCI. Specifically, DCI formats 0 and 4 (a UL grant) are defined for UL scheduling and DCI formats 1, 1A, 1B, 1C, 1D, 2, 2A, 2B, and 2C (a DL grant) are defined for DL scheduling. Depending on its usage, a DCI format selectively includes information such as a hopping flag, an RB assignment, a Modulation Coding Scheme (MCS), a Redundancy Version (RV), a New Data Indicator (NDI), a TPC, a cyclic shift, a DeModulation Reference Signal (DM-RS), a Channel Quality Information (CQI) request, an HARQ process number, a Transmitted Precoding Matrix Indicator (TPMI), Precoding Matrix Indicator (PMI) confirmation, etc.

An eNB determines a PDCCH format according to control information to be transmitted to a UE and adds a Cyclic Redundancy Check (CRC) to the control information, for error detection. The CRC is masked by an ID (e.g., a Radio Network Temporary Identifier (RNTI)) according to the owner or usage of a PDCCH. In other words, the PDCCH is CRC-scrambled with the ID (e.g., the RNTI).

[Table 3] lists exemplary IDs by which a PDCCH is masked.

TABLE 3

| Type | Identifier | Description |
|---|---|---|
| UE-specific | C-RNTI, TC-RNTI, SPS C-RNTI | used for a unique UE identification |
| Common | P-RNTI | used for paging message |
| | SI-RNTI | used for system information |
| | RA-RNTI | used for random access response |

If a C-RNTI, a Temporary C-RNTI (TC-RNTI), and a Semi-Persistent Scheduling C-RNTI (SPS C-RNTI) are used, the PDCCH delivers UE-specific control information for a specific UE. If other RNTIs are used, the PDCCH delivers common control information for all UEs in a cell.

The LTE(-A) standard defines the CCE positions of a limited set (equivalent to a limited CCE set or a limited PDCCH candidate set) in which a PDCCH may be located, for each UE. The CCE positions of a limited set that a UE should monitor to detect a PDCCH directed to the UE may be referred to as a Search Space (SS). Monitoring includes decoding each PDCCH candidate (blind decoding). A UE-specific Search Space (USS) and a Common Search Space (CSS) are defined. A USS is configured on a UE basis and a CSS is configured commonly for UEs. The USS and the CSS may be overlapped. The starting position of the USS hops between subframes UE-specifically. An SS may have a different size according to a PDCCH format.

[Table 4] lists CSS sizes and USS sizes.

TABLE 4

| PDCCH format | Number of CCEs (n) | Number of PDCCH candidates in CSS | Number of PDCCH candidates in USS |
|---|---|---|---|
| 0 | 1 | — | 6 |
| 1 | 2 | — | 6 |
| 2 | 4 | 4 | 2 |
| 3 | 8 | 2 | 2 |

To place computation load under control according to the total number of Blind Decodings (BDs), a UE is not required to detect all defined DCI formats at the same time. In general, the UE always detects formats 0 and 1A in a USS. Formats 0 and 1A have the same size and are distinguished from each other by a flag in a message. The UE may be required to receive an additional format (e.g., format 1, 1B, or 2 according to a PDSCH Transmission Mode (TM) configured by an eNB). The UE detects formats 1A and 1C in a CSS. The UE may further be configured to detect format 3 or 3A. Formats 3 and 3A have the same size as formats 0 and 1A and may be identified by scrambling a CRC with different IDs (or a common ID), instead of UE-specific IDs.

PDSCH transmission schemes according to TMs and information content of DCI formats are given as follows.

TMs
TM 1: transmission from a single eNB antenna port
TM 2: transmit diversity
TM 3: open-loop spatial multiplexing
TM 4: closed-loop spatial multiplexing
TM 5: Multi-User Multiple Input Multiple Output (MU-MIMO)
TM 6: closed-loop rank-1 precoding
TM 7: single-antenna port (port 5) transmission
TM 8: double-layer transmission (port 7 and port 8) or single-antenna port (port 7 or port 8) transmission
TMs 9 and 10: up to 8-layer transmission (port 7 to port 14) or single-antenna port (port 7 or port 8) transmission DCI Formats
format 0: resource grant for PUSCH transmission
format 1: resource allocation for single-codeword PDSCH transmission (TMs 1, 2 and 7)
format 1A: compact signaling of resource allocation for single-codeword PDSCH (all modes)
format 1B: compact resource allocation for PDSCH (mode 6) using rank-1 closed-loop precoding
format 1C: very compact resource allocation for PDSCH (e.g., paging/broadcast system information)
format 1D: compact resource allocation for PDSCH using MU-MIMO (mode 5)
format 2: resource allocation for PDSCH of closed-loop MIMO operation (mode 4)
format 2A: resource allocation for PDSCH of open-loop MIMO operation (mode 3)
format 3/3A: power control command having 2-bit/1-bit power control value for PUCCH and PUSCH
format 4: resource grant for PUSCH transmission in a cell set to multi-antenna port transmission mode DCI formats may be classified into a TM-dedicated format and a TM-common format. The TM-dedicated format is a DCI format configured for a corresponding TM only, and the TM-common format is a DCI format configured commonly for all TMs. For example, DCI format 2B may be a TM-dedicated DCI format for TM 8, DCI format 2C may be a TM-dedicated DCI format for TM 9, and DCI format 2D may be a TM-dedicated DCI format for TM 10. DCI format 1A may be a TM-common DCI format.

Figure 5:
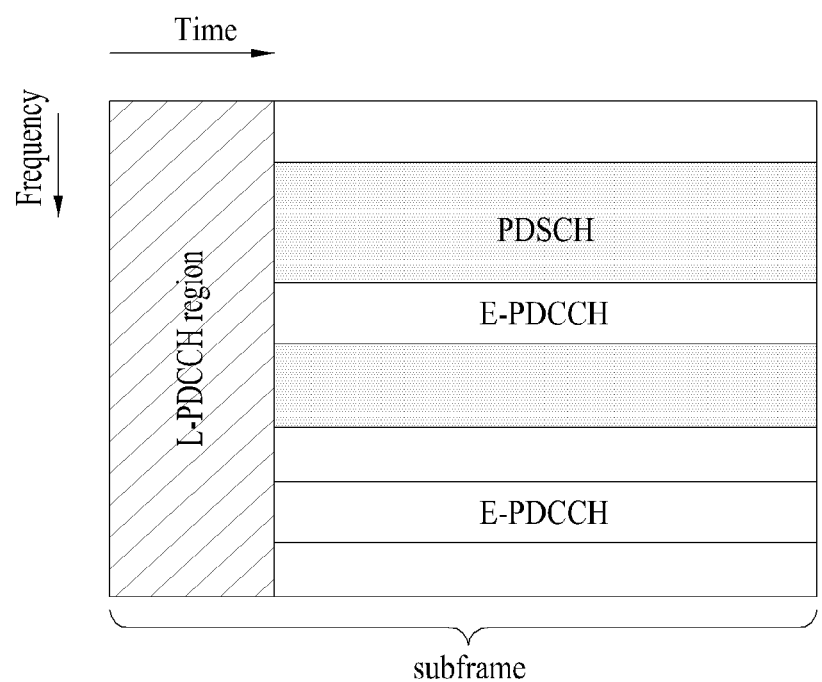
FIG. 5 illustrates an example of allocating Enhanced Physical Downlink Control Channels (E-PDCCHs) to an SF.

FIG. 5 illustrates an example of allocating Enhanced PDCCHs (E-PDCCHs) to a subframe. A legacy LTE system has limitations such as transmission of a PDCCH in limited OFDM symbols. Accordingly, LTE-A has introduced the E-PDCCH for more flexible scheduling.

Referring to FIG. 5, a PDCCH conforming legacy LTE (-A) (referred to as a legacy PDCCH or L-PDCCH) may be allocated to a control region (refer to FIG. 4). An L-PDCCH region means a region to which an L-PDCCH may be allocated. The L-PDCCH region may refer to a control region, a control channel resource region (i.e., CCE resources) to which a PDCCH may be actually allocated, or a PDCCH SS depending on the context. A PDCCH may be additionally allocated to a data region (refer to FIG. 4). The PDCCH allocated to the data region is referred to as an E-PDCCH. As illustrated in FIG. 5, a scheduling constraint imposed by the limited control channel resources of the L-PDCCH region may be relieved by additionally securing control channel resources through the E-PDCCH. An E-PDCCH and a PDSCH are multiplexed in Frequency Division Multiplexing (FDM) in the data region.

Specifically, the E-PDCCH may be detected/demodulated based on DM-RS. The E-PDCCH is transmitted in a Physical Resource Block (PRB) pair along the time axis. If E-PDCCH-based scheduling is configured, a subframe in which an E-PDCCH will be transmitted/detected may be indicated. The E-PDCCH may be configured only in a USS. A UE may attempt to detect DCI only in an L-PDCCH CSS and an E-PDCCH USS in a subframe allowed to carry an E-PDCCH (hereinafter, an E-PDCCH subframe) and in an L-PDCCH CSS and an L-PDCCH USS in a subframe not allowed to carry an E-PDCCH (hereinafter, a non-E-PDCCH subframe).

Like the L-PDCCH, the E-PDCCH delivers DCI. For example, the E-PDCCH may deliver DL scheduling information and UL scheduling information. An E-PDCCH/PDSCH operation and an E-PDCCH/PUSCH operation are performed in the same manner as/a similar manner to steps S107 and S108 of FIG. 1. That is, a UE may receive an E-PDCCH and receive data/control information on a PDSCH corresponding to the E-PDCCH. In addition, the UE may receive an E-PDCCH and transmit data/control information on a PUSCH corresponding to the E-PDCCH. In the legacy LTE system, a PDCCH candidate region (a PDCCH SS) is reserved in a control region and a PDCCH for a specific UE is transmitted in a part of the PDCCH SS. Therefore, a UE may detect its PDCCH in the PDCCH SS by blind decoding. Similarly, an E-PDCCH may also be transmitted in all or a part of reserved resources.

Figure 6:
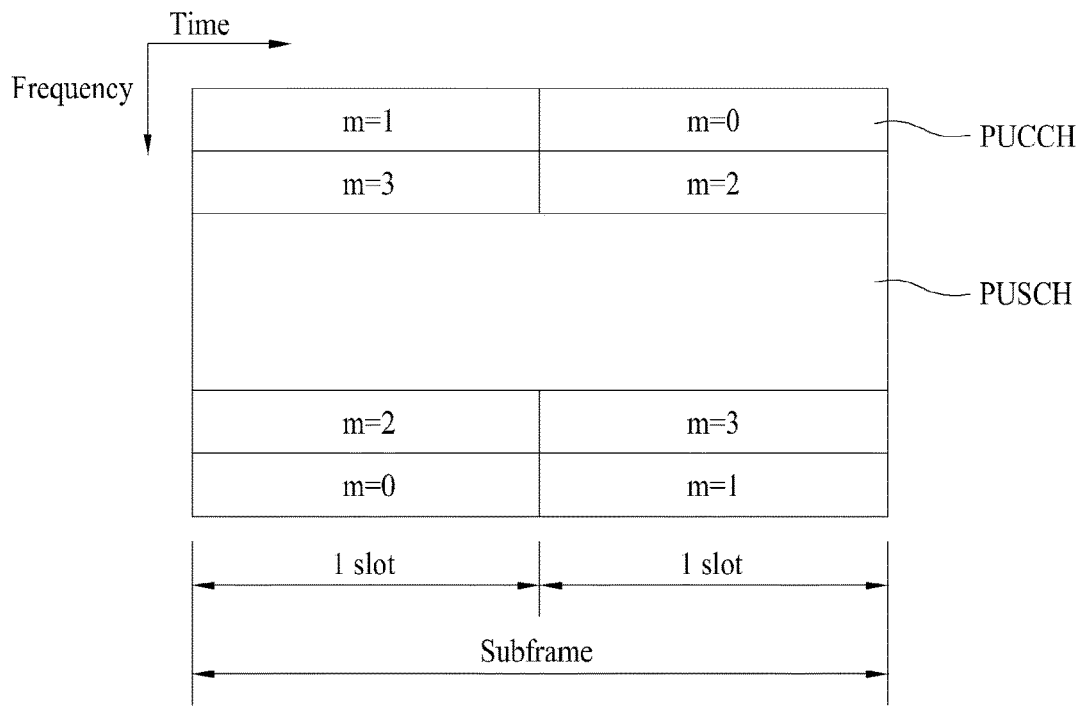
FIG. 6 illustrates an Uplink (UL) SF structure.

FIG. 6 illustrates a structure of a UL subframe in the LTE system.

Referring to FIG. 6, a UL subframe includes a plurality of slots (e.g. 2 slots). Each slot may include a different number of SC-FDMA symbols according to a Cyclic Prefix (CP) length. The UL subframe is divided into a control region and a data region in the frequency domain. A PUSCH carrying a data signal such as voice or the like is transmitted in the data region, and a PUCCH carrying Uplink Control Information (UCI) is transmitted in the control region. The PUCCH includes an RB pair located at both ends of the data region along the frequency axis and hops over a slot boundary.

The PUCCH may carry the following control information.

Scheduling Request (SR): information used to request UL-SCH resources. The SR is transmitted in On-Off Keying (OOK).

HARQ response: a response signal to a DL data block (e.g., a Transport Block (TB)) or a CodeWord (CW) on a PDSCH. The HARQ response indicates whether the DL data block has been received successfully. A 1-bit ACK/NACK is transmitted as a response to a single DL codeword and a 2-bit ACK/NACK is transmitted as a response to two DL codewords. An HARQ ACK/NACK and an HARQ-ACK may be interchangeably used in the same meaning of an HARQ response.

Channel Quality Indicator (CSI): feedback information for a DL channel. MIMO-related feedback information includes an RI and a PMI. The CQI occupies 20 bits per subframe.

The amount of UCI that a UE may transmit in a subframe depends on the number of SC-FDMA symbols available for transmission of the UCI. The SC-FDMA symbols available for transmission of the UCI are the remaining SC-FDMA symbols except SC-FDMA symbols configured for transmitting RSs in the subframe. The last SC-FDMA symbol of a subframe configured to carry an SRS is additionally excluded from the SC-FDMA symbols available for transmission of the UCI. An RS is used for coherent detection of a PUCCH. A PUCCH supports 7 formats according to information carried on the PUCCH.

Table 5 illustrates a mapping relationship between PUCCH formats and UCI in the LTE system.

TABLE 5

| PUCCH format | Uplink Control Information (UCI) |
|---|---|
| format 1 | SR(Scheduling Request) (non-modulated waveform) |
| format 1a | 1-bit HARQ ACK/NACK (SR present/absent) |
| format 1b | 2-bit HARQ ACK/NACK (SR present/absent) |
| format 2 | CQI (20 coded bits) |
| format 2 | CQI and 1- or 2-bit HARQ ACK/NACK (20 bits) (only in case of extended CP) |
| format 2a | CQI and 1-bit HARQ ACK/NACK (20 + 1 coded bits) |
| format 2b | CQI and 2-bit HARQ ACK/NACK (20 + 2 coded bits) |

Figure 7:
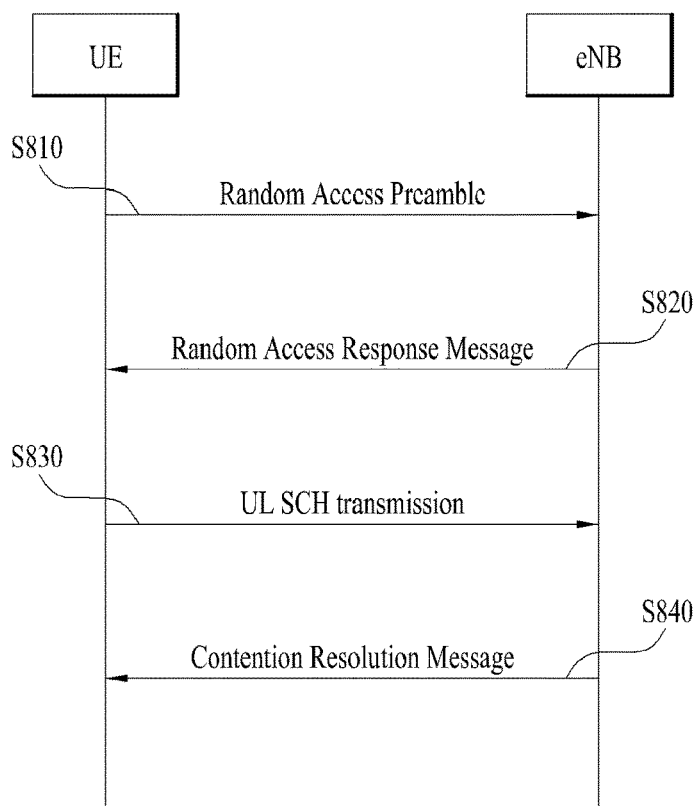
FIG. 7 illustrates a random access procedure.

FIG. 7 illustrates an example of mapping PUCCH formats to a PUCCH region.

Referring to FIG. 7, PUCCH formats are mapped to RBs in the order of PUCCH format 2/2a/2b (CQI) (e.g. PUCCH region m=0, 1), PUCCH format 2/2a/2b (CQI) or PUCCH format 1/1a/1b (SR/HARQ ACK/NACK) (e.g. PUCCH region m=2 if present), and PUCCH format 1/1a/1b (SR/HARQ ACK/NACK) (e.g. PUCCH region m=3, 4, 5), inward starting from a band edge, and transmitted. The number of PUCCH RBs, $N_{RB}^{(2)}$ available for PUCCH format 2/2a/2b (CQI) is indicated to a UE in a cell by broadcast signaling.

FIG. 7 illustrates a random access procedure. The random access procedure is used to transmit UL short data. For example, upon occurrence of initial access in Radio Resource Control (RRC)_IDLE mode, initial access after Radio Link Failure (RLF), or handover requiring random access, or upon generation of UL/DL data requiring random access in RRC_CONNECTED mode, the random access procedure is performed. The random access procedure is performed in a contention-based manner or a non-contention-based manner.

Referring to FIG. 7, a UE receives random access information from an eNB by system information and stores the received random access information. Subsequently, when random access is needed, the UE transmits a random access preamble (message 1 or Msg1) to the eNB on a PRACH (S810). Upon receipt of the random access preamble from the UE, the eNB transmits a random access response message (message 2 or Msg2) to the UE (S820). Specifically, DL scheduling information for the random access response message is CRC-masked by a Random Access-RNTI (RA-RNTI) and transmitted on a PDCCH. Upon receipt of the DL scheduling signal masked by the RA-RNTI, the UE may receive the random access response message on a PDSCH. Then, the UE determines whether a Random Access Response (RAR) directed to the UE is included in the random access response message. The RAR includes a Timing Advance (TA), UL resource allocation information (a UL grant), a temporary UE ID, etc. The UE transmits a UL-SCH message (message 3 or Msg3) to the eNB according to the UL grant (S830). After receiving the UL-SCH message, the eNB transmits a contention resolution message (message 4 or Msg4) to the UE (S840).

Meanwhile, the UE may be stipulated to simultaneously receive a plurality of data for a specific data combination. Table 6 and Table 7 show combinations of physical/transport channels a single UE can simultaneously receive in the same subframe. Particularly, Table 6 shows downlink reception types and Table 7 shows combinations of downlink reception types.

TABLE 6

| "Reception Type" | Physical Channel(s) | Monitored RNTI | Associated Transport Channel |
|---|---|---|---|
| A | PBCH | N/A | BCH |
| B | PDCCH + PDSCH | SI-RNTI | DL-SCH |
| C | PDCCH + PDSCH | P-RNTI | PCH |
| D | PDCCH + PDSCH | RA-RNTI (Note 3) | DL-SCH |
|  |  | Temporary C-RNTI (Note 3) (Note 4) | DL-SCH |
|  | (PDCCH/EPDCCH) + PDSCH | C-RNTI and Semi-Persistent Scheduling C-RNTI | DL-SCH |
| D1 | (PDCCH/EPDCCH) + PDSCH (Note 9) | C-RNTI | DL-SCH |
| E | PDCCH/EPDCCH (Note 1) | C-RNTI | N/A |
| F | PDCCH | Temporary C-RNTI (Note 5) | UL-SCH |
|  | PDCCH/EPDCCH | C-RNTI and Semi-Persistent Scheduling C-RNTI | UL-SCH |
| F1 | PDCCH/EPDCCH (Note 9) | C-RNTI | UL-SCH |
| G | PDCCH | TPC-PUCCH-RNTI | N/A |
| H | PDCCH | TPC-PUSCH-RNTI | N/A |
| I | PDCCH/EPDCCH | Semi-Persistent Scheduling C-RNTI (Note 6) | N/A |

TABLE 6-continued

| "Reception Type" | Physical Channel(s) | Monitored RNTI | Associated Transport Channel |
|---|---|---|---|
| J | PDCCH/EPDCCH | Semi-Persistent Scheduling C-RNTI (Note 7) | N/A |
| K | PDCCH | M-RNTI (Note 8) | N/A |
| L | PMCH | N/A (Note 8) | MCH |

Note 1:
PDCCH or EPDCCH is used to convey PDCCH order for Random Access.
Note 2:
Void.
Note 3:
RA-RNTI and Temporary C-RNTI are mutually exclusive and only applicable during Random Access procedure.
Note 4:
Temporary C-RNTI is only applicable when no valid C-RNTI is available.
Note 5:
Temporary C-RNTI is only applicable during contention-based Random Access procedure.
Note 6:
Semi-Persistent Scheduling C-RNTI is used for DL Semi-Persistent Scheduling release.
Note 7:
Semi-Persistent Scheduling C-RNTI is used for UL Semi-Persistent Scheduling release.
Note 8:
In MBSFN subframes only
Note 9:
DL-SCH reception corresponding to D1, and UL-SCH transmission corresponding to F1, are only applicable to SCells.

TABLE 7

| Combination | Mandatory/Optional | Comment |
|---|---|---|
| 1 × A + 1 × B + 1 × C | Mandatory | RRC_IDLE |
| 1 × K + 1 × L | Mandatory for MBMS UEs | RRC_IDLE |
| 1 × A + 1 × B + 1 × (D or (1 − m) × E or G or I) + (p − 1 − m) × D1 + m × E + 1 × (F or H or J) + (q − 1) × F1 | Mandatory. (NOTE 3) | RRC_CONNECTED |
| 1 × A + 1 × B + 1 × (D or (1 − m) × E or G or I) + 1 × (F or H or J) + 1 × F + (p − 1 − m) × D1 + m × E + 2 × (q − 1) × F1 | Mandatory for UEs supporting FS2. (NOTE 3) (NOTE 4) | RRC_CONNECTED (NOTE 1) |
| ((1 × ((1 − m) × E or G or I) + t × L) or 1 × D) + 1 × (F or H or J) + r × K + (p − 1 − m) × D1 + m × E + (q − 1) × F1 + (r − t) × L + (r − t + 1) × (A + B) | Mandatory for MBMS UEs. (NOTE 3) (NOTE 4) | RRC_CONNECTED (NOTE 2) |
| ((1 × ((1 − m) × E or G or I) + t × L) or 1 × D) + 1 × (F or H or J) + 1 × F + r × K + (p − 1 − m) × D1 + m × E + 2 × (q − 1) × F1 + (r − t) × L + (r − t + 1) × (A + B) | Mandatory for MBMS UEs supporting FS2. (NOTE 3) | RRC_CONNECTED (NOTE 1) (NOTE 2) |
| 1 × A + 1 × B + 1 × C + 1 × (D or (1 − m) × E or G or I) + (p − 1 − m) × D1 + m × E + 1 × (F or H or J) + (q − 1) × F1 | Mandatory for ETWS and CMAS UEs Optional for all other UEs. (NOTE 3) | RRC_CONNECTED |
| 1 × A + 1 × B + 1 × C + 1 × (D or (1 − m) × E or G or I) + 1 × (F or H or J) + 1 × F + (p − 1 − m) × D1 + m × E + 2 × (q − 1) × F1 | Mandatory for ETWS and CMAS UEs supporting FS2 Optional for all other UEs. (NOTE 3) | RRC_CONNECTED (NOTE 1) |

NOTE 1:
For TDD UL/DL configuration 0, two PDCCHs or EPDCCHs can be received in the same subframe for UL-SCH in two different uplink subframes.
NOTE 2:
The combination is the requirement when MBMS reception is on PCell and/or any other cell. r is the number of DL CCs on which the UE supports MBMS reception according to the MBMSInterestIndication. t = 1 if there is PMCH reception in the PCell, otherwise t = 0. PDSCH and PMCH are mutually exclusive in the same subframe on a cell.
NOTE:
p is the number of DL CCs supported by the UE. q is the number of UL CCs supported by the UE. q = p = 1 implies non-CA capable UE. m = 0 or 1 for UE supporting multiple TAGs, otherwise m = 0.
NOTE:
The UE is only required to receive one PDSCH, pertaining to D or D1, per DL CC.
NOTE 3:
Combination involving EPDCCH is optional and required only for UE supporting EPDCCH.
NOTE 4:
It is not required to simultaneously receive EPDCCH and PMCH on the same cell.

and the like is currently considered by a next-generation system of LTE-A. Such a UE is called LC (Low Cost) UE (or, LC type, LC type UE) (e.g., MTC (Machine Type Communication) UE) for clarity. The LC UE can be defined as a UE of a specific category based on a UE capability category. In case of the LC UE, the amount of data transmitted is small and uplink/downlink data transmission/reception does not frequently occur, and thus it is efficient to reduce the unit cost of the UE and reduce battery consumption according to the low data transmission rate. Furthermore, the LC UE has the feature that mobility is low and the channel environment rarely changes. In consideration of a poor situation that an LC UE is installed in a coverage-limited place such as a building, a factory, a basement or the like in the future, various coverage enhancement schemes for each channel/signal are under discussion. For example, a method of repeatedly transmitting a channel/signal is under discussion in order to enhance the coverage.

Meanwhile, the reduction of the number of receiving antennas, the reduction of the maximum TB size, the reduction of the receiving buffer size and the like are under consideration as a technology for a low price/low specification LC UE. In case of the reduction of the maximum TB size, in order to efficiently reduce the decoding complexity/latency for the DL received data (e.g., PDSCH) having a

Embodiment: A Signal Transmission/Processing for a Low-Price User Equipment

A low cost/low capability UE centering on data communications of meter inspection, water level measurement, monitoring camera utilization, vending machine stock report great influence upon the unit cost/costs of the LC UE, the maximum TB size (e.g., the bit number) of the UE-common data (hereinafter, common data) and the maximum TB size of the UE-specific data (hereinafter, unicast data) can be differently defined. This is because a mainly applicable appropriate message size and/or a required coding rate vary depending on the data type (i.e., common data and unicast data).

The common data may include data associated with SI-RNTI, P-RNTI and RA-RNTI (i.e., SIB, a paging message and RAR). The unicast data may include data associated with C-RATI, SPS C-RNTI and TC-RNTI (i.e., data about an individual UE). Therefore, a scrambling based on SI-RNTI, P-RNTI or RA-RATI may apply to a PDCHH scheduling a PDSCH (common data) and a scambling based on C-RNTI, SPS C-RNTI or TC-RNTI may apply to a PDCCH for scheduling a PDSCH (unicast data).

Meanwhile, a plurality of data can be simultaneously scheduled/transmitted through one subframe and an LC UE can be stipulated to simultaneously receive a plurality of data for a specific data combination. According to a related art, for example (see Table 6 and Table 7), an LC UE can be stipulated to simultaneously receive an SIB and a paging which are simultaneously scheduled/transmitted through one subframe in RRC idle mode. Further, in RRC-connected mode, an LC UE can be stipulated to simultaneously receive an SIB and an RAR or an SIB and unicast data which are simultaneously scheduled/transmitted through one subframe. Particularly, when the LC UE is restricted to support a single DL CC, a specific data combination simultaneously receivable by the LC UE may correspond to a case that p=q=1 and m=0 in Table 7.

When the maximum TB sizes corresponding to common data and unicast data for the LC UE are differently defined, (particularly, in RRC-connected mode) a simultaneously receivable maximum TB size combination (for each data type) may need to be defined. In this case, when the maximum TB size corresponding to a specific data type is differently defined depending on the data transmission phase, an effective received signal processing operation of the UE may be necessary. For example, if the maximum TB size corresponding to a specific data type is differently stipulated depending on a case of solely receiving the corresponding data type or a case of simultaneously receiving the corresponding data type together with another data type, an effective received signal processing operation of the UE may be necessary.

A data receiving method/operation of an LC UE is proposed below. The present invention may be limited to a case that the LC UE is in RRC-connected mode. Unless indicated otherwise, the UE indicates an LC UE. For clarity, the following terms are defined.

Common data: Common data indicates data transmitted to a plurality of user equipments. Common data includes SIB/paging/RAR. And, the SIB/paging/RAR is associated with SI-RNTI-/P-RNTI/RA-RNTI. Particularly, common data is transmitted through a PDSCH and an SI-RNTI/P-RNTI/RA-RNTI based scrambling may apply to a PDCCH for scheduling a PDSCH (common data). An RNTI-based scrambling includes a scrambling (e.g., XOR) of CRC of PDCCH with RNTI.

Unicast data: Unicast data indicates data transmitted to a single user equipment. Unicast data is associated with C-RNTI/SPS C-RNTI/TC-RNTI. Particularly, unicast data may be transmitted through a PDSCH and a C-RNTI/SPS C-RNTI/TC-RNTI based scrambling may apply to a PDCCH for scheduling the PDSCH (unicast data). An RNTI-based scrambling includes a scrambling (e.g., XOR) of CRC of PDCCH with RNTI.

Dedicated data: RAR, unicast data $T_c$: The maximum TB size of common data when the common data is solely received $T_u$: The maximum TB size of unicast data when unicast data is solely received $T_s$: The maximum TB size of common data when common data (e.g., an SIB) and dedicated data are simultaneously received $T_d$: The maximum TB size of dedicated data when common data (e.g., an SIB) and dedicated data are simultaneously received It is assumed that the relation of maximum TB sizes is $T_c=T_s>T_u=T_d$. In case of specific data (e.g., RAR), the maximum TB size $T_c$ at the individual reception and the maximum TB size $T_d$ at the simultaneous reception can be differently set (i.e., $T_c>T_d$). In this case, the maximum Tb size indicates the maximum TB size that can be processed by the UE. The unit of the TB size is a bit.

Hence, the present invention proposes a method/operation of simultaneously receiving a plurality of data in the case that specific data (e.g., RAR) (hereinafter, RAR) is included in common data and dedicated data in common. Particularly, the present invention proposes a method/operation of receiving data in a situation that the actual TB size of RAR scheduled/transmitted simultaneously with common data (e.g., an SIB) through one subframe exceeds the maximum TB size $T_d$ corresponding to the simultaneous reception (while not exceeding the maximum TB size $T_c$ corresponding to individual reception). For clarity, TB sizes applied to actual scheduling/transmission of common data (e.g., SIB) (hereinafter, SIB) and RAR are defined as T_sib and T_rar, respectively.

Case of $Td<T\_sib \leq Ts(=Tc), Td<T\_rar(\leq Tc=Ts)$      Case 1)

In a current situation, SIB is equal to or smaller than the maximum TB size and exceeds the maximum TB size corresponding to RAR and the RAR exceeds the corresponding maximum size. In this case, the UE may select only one data from SIB and RAR and then receives the selected one data (option 1-1), or may omit reception of both SIB and RAR (option 1-2). In case of option 1-1, the UE may i) always select RAR, ii) always select SIB, or iii) select SIB when RAR is received as a part of an RACH process based on contention (or not accompanied by PDCCH order) and select RAR when RAR is received as a part of an RACH process based on non-contention (or accompanied by PDCCH order).

In the present specification, selecting and receiving data includes performing a received signal processing (e.g., decoding or the like) on selected data only. Further, omitting data reception includes omitting a received signal processing (e.g., decoding or the like) on PDSCH indicated by PDCCH. The TB size of the PDSCH can be obtained through scheduling information of the corresponding PDCCH.

Meanwhile, the present method can apply to a UE (reception) operation in a situation that each of SIB and RAR exceeds the maximum TB size corresponding to unicast data Tu=Td. Namely, the present method can apply to the UE reception operation in the case that $Tu<T\_sib \leq Ts=Tc$, $Tu<T\_rar \leq Tc=Ts$. In this case, the UE may selects only one data from SIB and RAR and then receives the selected data only, or may omit reception of both SIB and RAR. In the former case, the UE may i) always select RAR, ii) always select SIB, or iii) select SIB when RAR is received as a part of an RACH process based on contention (or not accompanied by PDCCH order) and select RAR when RAR is received as a part of an RACH process based on non-contention (or accompanied by PDCCH order). Meanwhile, in other cases (e.g., when only one of SIB and RAR exceeds the maximum TB size corresponding to unicast data Tu=Td), simultaneous reception may be performed for both SIB and RAR. Namely, in the case that (i) T_sib≤Tu, Tu<T_rar≤Tc=Ts and (ii) Tu<T_sib≤Ts=Tc, T_rar≤Tu, the UE can perform simultaneous reception for both SIB and RAR.

Figure 8:
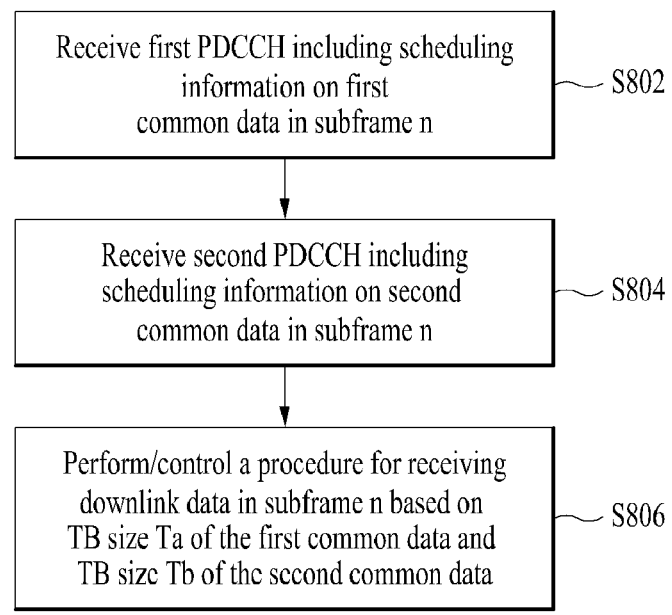
FIG. 8 illustrates an example of a process for receiving a downlink signal according to one embodiment of the present invention.

FIG. 8 illustrates an example of a process for receiving a downlink signal according to one embodiment of the present invention.

Referring to FIG. 8, a user equipment (UE) can receive a first PDCCH including scheduling information on a first common data in a subframe (e.g., subframe n) (S802). Further, the UE can receive a second PDCCH including scheduling information on a second common data in the same subframe (i.e., subframe n). Thereafter, the UE may perform/control a process for receiving downlink data in the subframe n based on TB size Ta of the first common data and TB size Tb of the second common data (S806). If T1<Ta≤T2 and T1<Tb≤T2, a reception (a signal processing) can be selectively performed on only one of the first common data and the second common data. Meanwhile, if Ta≤T1 and T1<Tb≤T2 or T1<Ta≤T2 and Tb≤T1, a reception (a signal processing) can be performed on both of the first common data and the second common data. In this case, T1 indicates the maximum TB size at the time of solely receiving unicast data. T2 indicates the maximum TB size at the time of solely receiving common data.

In this case, the first common data may include SIB and the second common data may include RAR. In this case, when T1<Ta≤T2 and T1<Tb≤T2, a received signal processing may be performed on only SIB among SIB and RAR or the received signal processing may be performed on only RAR. Further, if T1<Ta≤T2 and T1<Tb≤T2, when RAR is transmitted as a part of a contention-based RACH (Random Access Channel) process, a received signal processing may be performed on only SIB among SIB and RAR. Or, when RAR is transmitted as a part of a non-contention-based RACH process, the received signal processing may be performed on only RAR among SIB and RAR. The received signal processing includes decoding TB. In the case that a reception (a signal processing) is performed on only one of a plurality of data, a reception of other data may be omitted. To this end, when the UE detects a PDCCH including scheduling information on the reception-omitted data, the UE can omit a received signal processing (e.g., decoding) for the PDSCH indicated by the corresponding PDCCH.

Case of $T\_sib \leq Td, Td < T\_rar(\leq Tc=Ts)$     Case 2)

In a current state, SIB is equal to or smaller than the corresponding maximum TB size and is equal to or smaller than the maximum TB size corresponding to RAR. In a current station, the RAR exceeds the corresponding maximum size. In this case, the UE may simultaneously receive both of the SIB and the RAR (option 2-1) or may omit reception of both of the SIB and the RAR (option 2-2). In case of option 2-1, the UE is already equipped with all decoders corresponding to the two kinds of the maximum TB sizes (i.e., Ts and Td), and thus it may be possible to simultaneously receive both of the SIB and the RAR, each of which has an actual TB size like the present example.

Case of $T\_sib > Ts(=Tc), Td < T\_rar(\leq Tc=Ts)$     Case 3)

In a current situation, each of SIB and RAR exceeds a corresponding maximum TB size. In this case, the UE can receive only RAR (option 3-1) or omit reception of both of the SIB and the RAR (option 3-2). In case of option 3-1, the UE is already equipped with a decoder corresponding to the maximum TB size Ts, and thus it may be possible to receive RAR having an actual TB size equal to or smaller than Ts.

Figure 9:
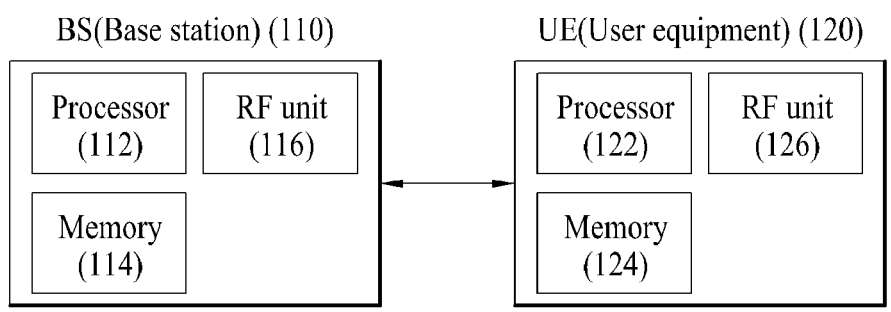
FIG. 9 illustrates block diagrams of a base station and a user equipment applicable to an embodiment of the present invention.

FIG. 9 illustrates a BS and a UE, which are applicable to embodiments of the present invention.

Referring to FIG. 9, the wireless communication system includes a BS 110 and a UE 120. The BS 110 includes a processor 112, a memory 114 and a radio frequency (RF) unit 116. The processor 112 may be configured to implement the procedures and/or methods proposed by the present invention. The memory 114 is connected to the processor 112 and stores information related to operations of the processor 112. The RF unit 116 is connected to the processor 112 and transmits and/or receives an RF signal. The UE 120 includes a processor 122, a memory 124 and an RF unit 126. The processor 122 may be configured to implement the procedures and/or methods proposed by the present invention. The memory 124 is connected to the processor 122 and stores information related to operations of the processor 122. The RF unit 126 is connected to the processor 122 and transmits and/or receives an RF signal. The BS 110 and/or the UE 120 may include a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The present invention is applicable to a method and apparatus for performing communication in a case that an MTC is supported in a wireless communication system.

What is claimed is:

1. A method of receiving downlink data by a user equipment in a wireless communication system, the method comprising:

receiving a plurality of scheduling information, each scheduling information being related to each of first and second data in a same time unit; and receiving at least one of the first data and the second data based on whether sizes of the first data and the second data are under processing capability of the user equipment, wherein the processing capability of the user equipment includes two maximum data sizes including a first maximum data size T1 and a second maximum data size T2, and the first maximum data size T1 is smaller than the second maximum data size T2, wherein the first data and the second data are a first non-unicast data of size Ta and a second non-unicast data of size Tb, wherein based on that T1<Ta≤T2 and T1<Tb≤T2, either the first non-unicast data or the second non-unicast data is received, and wherein based on that i) Ta≤T1 and T1<Tb≤T2 or ii) T1<Ta≤T2 and Tb≤T1, both the first non-unicast data and the second non-unicast data are received.

2. The method of claim 1, wherein the first non-unicast data comprises a System Information Block (SIB), and the second non-unicast data comprises a Random Access Response (RAR).

3. The method of claim 2, wherein based on that T1<Ta≤T2 and T1<Tb≤T2, only the SIB among the SIB and the RAR is received.

4. The method of claim 2, wherein based on that T1<Ta≤T2 and T1<Tb≤T2, only the RAR among the SIB and the RAR is received.

5. The method of claim 2, wherein based on that T1<Ta≤T2 and T1<Tb≤T2 and that the RAR is a part of a contention-based random access procedure, only the SIB among the SIB and the RAR is received.

6. The method of claim 2, wherein based on that T1<Ta≤T2 and T1<Tb≤T2 and that the RAR is a part of a non-contention-based random access procedure, only the RAR among the SIB and the RAR is received.

7. The method of claim 1, wherein each scheduling information is received through a respective Physical Downlink Control Channel (PDCCH) masked with a corresponding Radio Network Temporary Identifier (RNTI).

8. The method of claim 1, wherein the wireless communication system includes a 3rd Generation Partnership Project (3GPP)-based communication system.

9. A user equipment for receiving downlink data in a wireless communication system, the user equipment comprising:

a Radio Frequency (RF) unit; and at least one processor operatively coupled with the RF unit, wherein the at least one processor is configured to:

receive a plurality of scheduling information, each scheduling information being related to each of first and second data in a same time unit, and receive at least one of the first data and the second data based on whether sizes of the first data and the second data are under processing capability of the user equipment, wherein the processing capability of the user equipment includes two maximum data sizes including a first maximum data size T1 and a second maximum data size T2, and the first maximum data size T1 is smaller than the second maximum data size T2, wherein the first data and the second data are a first non-unicast data of size Ta and a second non-unicast data of size Tb, wherein based on that T1<Ta≤T2 and T1<Tb≤T2, either the first non-unicast data or the second non-unicast data is received, and wherein based on that i) Ta≤T1 and T1<Tb≤T2 or ii) T1<Ta≤T2 and Tb≤T1, both the first non-unicast data and the second non-unicast data are received.

10. The user equipment of claim 9, wherein the first non-unicast data comprises a System Information Block (SIB), and the second non-unicast data comprises a Random Access Response (RAR).

11. The user equipment of claim 10, wherein based on that T1<Ta≤T2 and T1<Tb≤T2, only the SIB among the SIB and the RAR is received.

12. The user equipment of claim 10, wherein based on that T1<Ta≤T2 and T1<Tb≤T2, only the RAR among the SIB and the RAR is received.

13. The user equipment of claim 10, wherein based on that T1<Ta≤T2 and T1<Tb≤T2 and that the RAR is a part of a contention-based random access procedure, only the SIB among the SIB and the RAR is received.

14. The user equipment of claim 10, wherein based on that T1<Ta≤T2 and T1<Tb≤T2 and that the RAR is a part of a non-contention-based random access procedure, only the RAR among the SIB and the RAR is received.

15. The user equipment of claim 9, wherein each scheduling information is received through a respective Physical Downlink Control Channel (PDCCH) masked with a corresponding Radio Network Temporary Identifier (RNTI).

16. The user equipment of claim 9, wherein the wireless communication system includes a 3rd Generation Partnership Project (3GPP)-based communication system.

* * * * *